United States Patent [19]
Goodwin, III

[11] Patent Number: 5,828,315
[45] Date of Patent: *Oct. 27, 1998

[54] METHOD OF SENDING MESSAGES TO ELECTRONIC PRICE LABELS PRIOR TO THEIR IDENTIFICATION WITH PRICE LOOK-UP ITEMS

[75] Inventor: John C. Goodwin, III, Suwanee, Ga.

[73] Assignee: NCR Corporation, Dayton, Ohio

[*] Notice: This patent issued on a continued prosecution application filed under 37 CFR 1.53(d), and is subject to the twenty year patent term provisions of 35 U.S.C. 154(a)(2).

[21] Appl. No.: 539,448

[22] Filed: Oct. 5, 1995

[51] Int. Cl.$^6$ ........................................... G06F 7/12
[52] U.S. Cl. .................. 340/825.54; 340/825.35; 340/825.52
[58] Field of Search ................. 340/825.54, 825.49, 340/825.35, 568, 571, 572, 825.52; 235/375, 383, 385; 364/464.01, 464.02, 464.03, 464.04; 395/220, 221

[56] References Cited

U.S. PATENT DOCUMENTS

| | | | |
|---|---|---|---|
| 5,103,222 | 4/1992 | Hogen Esch et al. | 340/825.54 |
| 5,124,699 | 6/1992 | Tervoert et al. | 340/825.54 |
| 5,172,314 | 12/1992 | Poland et al. | 364/401 |
| 5,241,467 | 8/1993 | Failing et al. | 364/401 |
| 5,448,226 | 9/1995 | Failing, Jr. et al. | 340/825.35 |
| 5,450,070 | 9/1995 | Massar et al. | 340/825.35 |
| 5,465,085 | 11/1995 | Caldwell et al. | 340/825.35 |
| 5,548,282 | 8/1996 | Escritt et al. | 340/825.35 |
| 5,565,858 | 10/1996 | Guthrie | 340/825.35 |
| 5,583,487 | 12/1996 | Ackerman et al. | 340/825.35 |

*Primary Examiner*—Michael Horabik
*Assistant Examiner*—Yonel Beaulieu
*Attorney, Agent, or Firm*—Paul W. Martin

[57] ABSTRACT

A method of sending messages to electronic price labels (EPLs) prior to their identification with price look-up (PLU) items which causes non-assigned EPLs to execute commands. In a first embodiment, non-assigned EPLs are provided with a common reserved EPL identification number. A broadcast message addressed to the reserved EPL identification number of the non-assigned EPLs and containing a command is transmitted as a broadcast message. Non-assigned EPLs accept the message and execute the command. In a second embodiment, non-assigned EPLs are provided with their own unique EPL identification numbers. A message addressed to the unique EPL identification number of the non-assigned EPL and containing a command is transmitted. Only the non-assigned EPL accepts the message and executes the command.

6 Claims, 3 Drawing Sheets

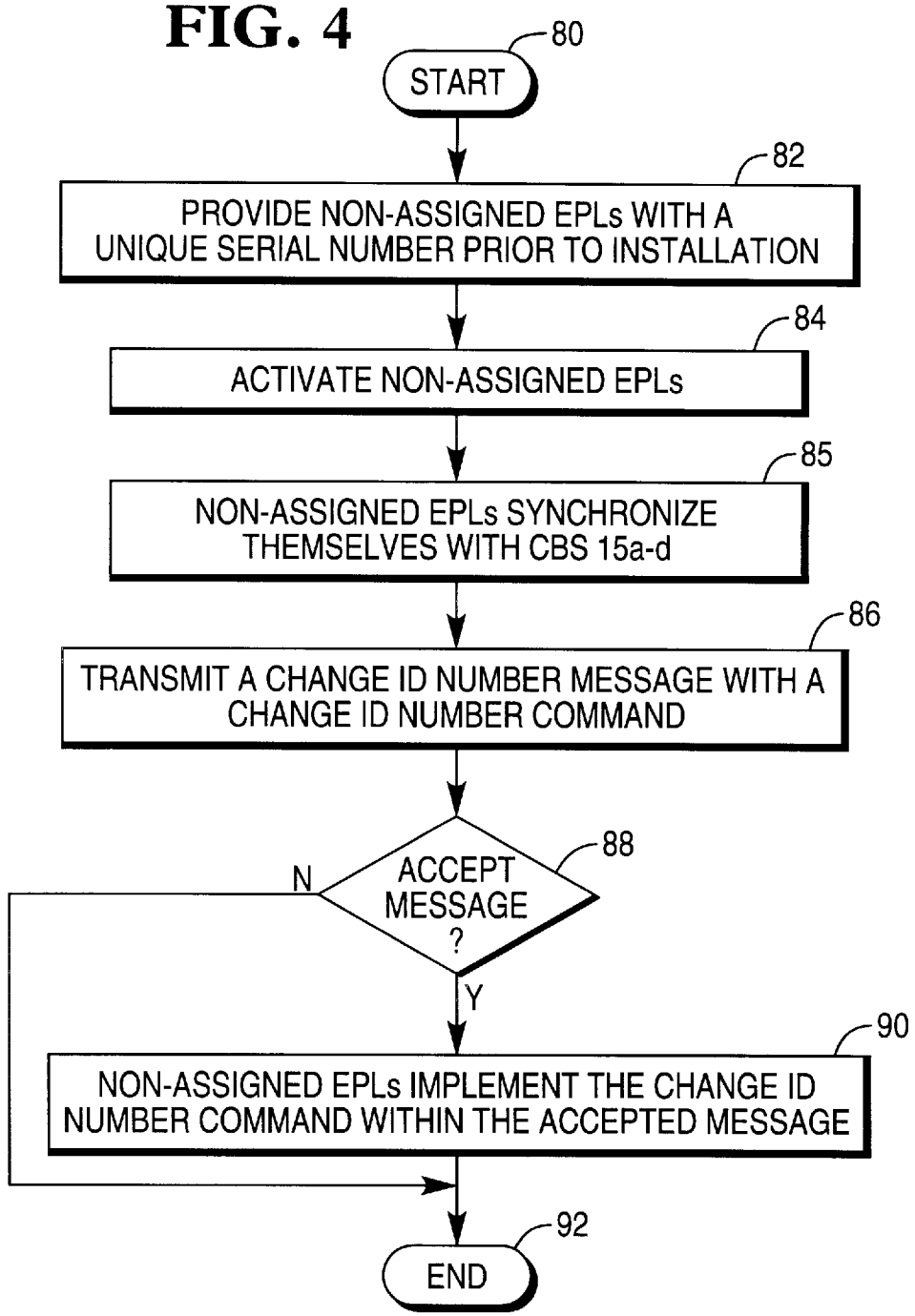

METHOD OF SENDING MESSAGES TO ELECTRONIC PRICE LABELS PRIOR TO THEIR IDENTIFICATION WITH PRICE LOOK-UP ITEMS

BACKGROUND OF THE INVENTION

The present invention relates to electronic price label (EPL) systems, and more specifically to a method of sending messages to EPLs prior to their identification with price look-up (PLU) items.

EPL systems typically include a plurality of EPLs for each merchandise item in a store. EPLs typically display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. Price information displayed by the EPLs is obtained from the PLU file.

In EPL systems, it is typical to block any messages to an EPL prior to its assignment to a specific PLU item so that it does not display any messages. This is done for ease of coding and to keep the EPL from 'accidentally' displaying something that looks like a price. The EPL is placed into a mode to only look for the assignment command. It ignores other types of messages—even though it really hears the message. However, this prevents the EPL from receiving important broadcast messages, such as diagnostic messages.

Therefore, it would be desirable to provide a method of sending messages to EPLs prior to their identification with price look-up (PLU) items to allow the non-assigned EPLs to receive predetermined messages, therefore keeping the display of the non-assigned EPL from displaying information that would look like a price.

SUMMARY OF THE INVENTION

In accordance with the teachings of the present invention, a method of sending messages to EPLs prior to their identification with price look-up (PLU) items is provided.

In a first embodiment, non-assigned EPLs are provided with a common reserved EPL identification number. A broadcast message addressed to the reserved EPL identification number of the non-assigned EPLs and containing a command is transmitted as a broadcast message. Non-assigned EPLs accept the message and execute the command.

The broadcast message is used for causing a plurality of non-assigned EPLs to execute the same command, such as a diagnostic command.

In a second embodiment, non-assigned EPLs are provided with their own unique EPL identification numbers. A message addressed to the unique EPL identification number of the non-assigned EPL and containing a command is transmitted. Only the non-assigned EPL accepts the message and executes the command.

The individually addressed message is used for causing a single non-assigned EPL to execute a command, such as a "change EPL identification number" command.

It is accordingly an object of the present invention to provide a method of sending messages to EPLs prior to their identification with price look-up (PLU) items.

It is another object of the present invention to provide a method of sending broadcast messages to EPLs prior to their identification with price look-up (PLU) items to allow the non-assigned EPLs to receive predetermined messages, therefore keeping the display of the non-assigned EPL from displaying information that would look like a price.

It is another object of the present invention to provide a method of sending diagnostic messages to EPLs prior to their identification with price look-up (PLU) items.

It is another object of the present invention to provide a method of sending diagnostic messages to EPLs after their identification with price look-up (PLU) items has been sent, for diagnostics.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 4 is a flow diagram illustrating a second method of sending messages to EPLs prior to their identification with price look-up (PLU) items.

DETAILED DESCRIPTION OF THE PREFERRED EMBODIMENT

Figure 1:
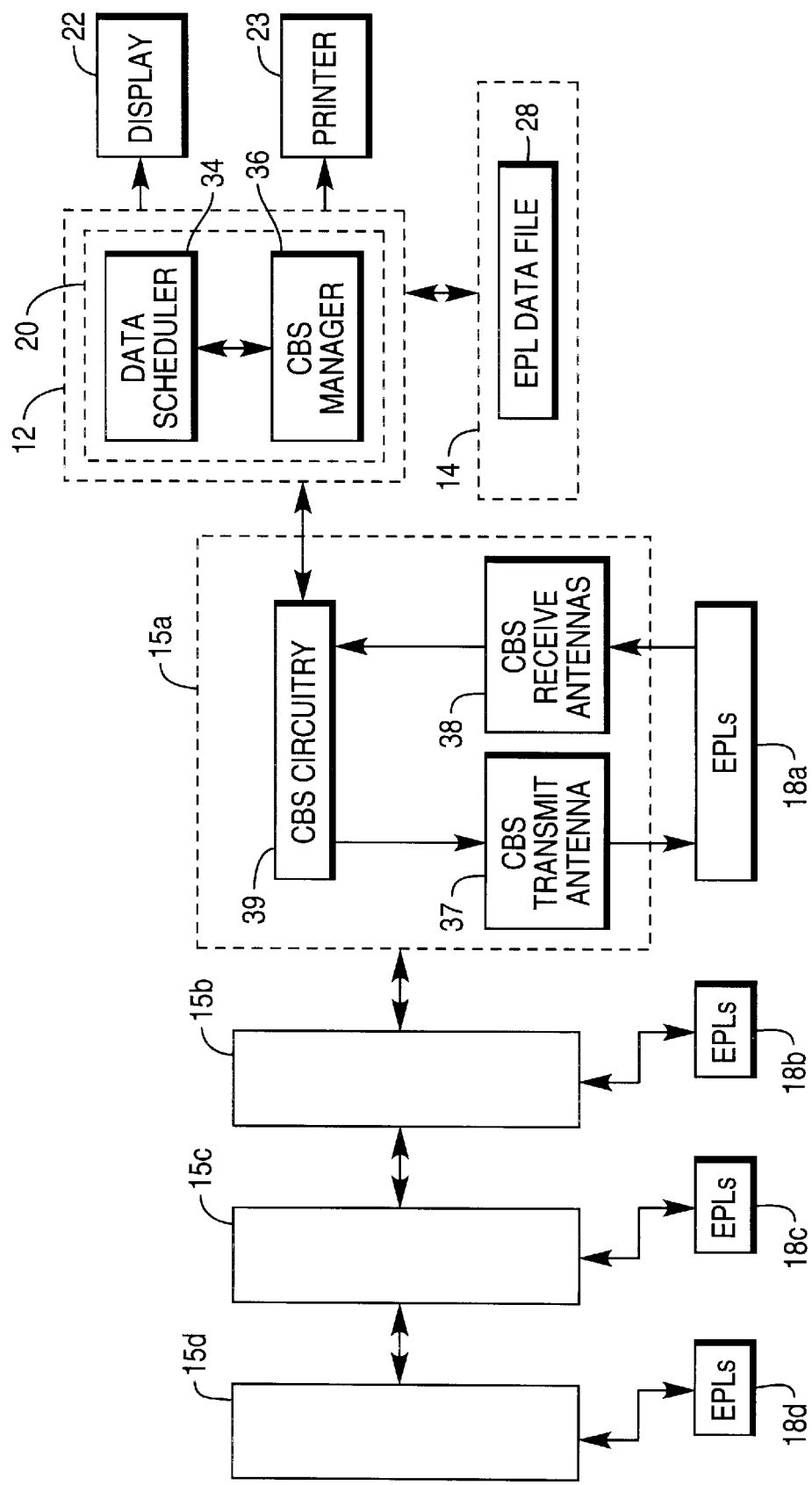
FIG. 1 is a block diagram of an EPL system.

Referring now to FIG. 1, EPL system 10 includes computer 12, storage medium 14, communication base stations (CBSs) 15a–d, electronic price labels (EPLS) 18a–d, display 22, and printer 23.

Computer 12 executes EPL control software 20. EPL control software 20 records, schedules, and transmits messages to EPLs 18a–d through CBSs 15a–d, and receives and analyzes status messages from EPLs 18a–d through CBSs 15a–d. Messages transmitted to EPLs 18a–d from CBS 15a–d include broadcast messages, individually addressed messages, and change identification number messages.

EPLs 18a–d include assigned and non-assigned EPLs. Assigned EPLs have unique EPL identification numbers which assigns them to PLU items. Non-assigned EPLs are preferably given an arbitrary reserved EPL identification number by the manufacturer (e.g., FFFF) and are not yet assigned to PLU items. This reserved EPL identification number tells the non-assigned EPLs to ignore messages. All EPLs from the manufacturer preferably have this same EPL identification number.

Both assigned and non-assigned EPLs contain a unique serial number that identifies them individually.

Broadcast and individually addressed messages contain information identifying one or more EPLs as an addressee of a message. Broadcast messages preferably employ a message identification number (e.g., 0000) telling all EPLs that a message is a broadcast message. The broadcast message identification number overrides the reserved EPL identification number so that non-assigned EPLs will listen to broadcast messages.

Individually addressed messages are addressed to EPL identification numbers, and therefore, may only be transmitted to assigned EPLs. A broadcast message is used to address a non-assigned EPL, since by definition, a non-assigned EPL is one that does not have its own EPL identification number.

A "change identification number" message provides a way around this limitation. A "change identification number" message is a message that is addressed to a non-assigned EPL by addressing the message to the non-assigned EPL's unique serial number. A "change identification number" message may also be sent to an EPL which is to be re-assigned to a different PLU item.

Messages include a command identification number which tells the addressees what to do. A diagnostic command may tell an EPL to display all segments and run internal diagnostics. An assignment command tells the EPL to change its EPL identification number from the manufacture-given number to a unique number. Commands are included as sub-messages. Assigned EPLs display information as instructed by the command within the broadcast message and return to displaying price information after a certain amount of time has elapsed. Non-assigned EPLs display information as instructed by the command within the broadcast message until another command is sent to reset the display.

The "change identification number" message contains an assignment command. Also contained in this message is a data field that contains a new EPL identification number.

EPL control software 20 also maintains and uses EPL data file 28, which contains item information, identification information used for addressing individual messages to EPLs, item price verifier information, and status information for each of EPLs 18a–d.

EPL control software 20 primarily includes data scheduler 34 and CBS manager 36. Data scheduler 34 schedules EPL messages to be sent to EPLs 18a–d through CBSs 15a–d.

Storage medium 14 is preferably a fixed disk drive. Storage medium 14 stores EPL data file 28.

CBSs 15a–d are connected together in series. Here, only four CBSs are shown. CBSs 15a–d each include one transmit antenna 37 and up to four receive antennas 38 for transmitting and receiving messages between CBSs 15a–d and EPLs 18a–d. CBSs 15a–d each include CBS circuitry 39 which controls operation of each CBS.

CBS manager 36 schedules the actual transmission of all messages to EPLs 18a–d and the reception of status messages from EPLs 18a–d.

Figure 2:
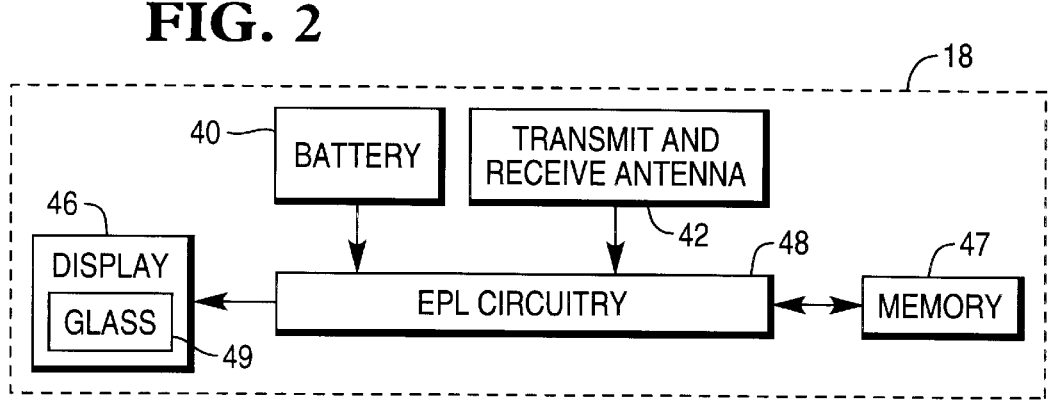
FIG. 2 is a block diagram of an EPL.

Turning now to FIG. 2, EPLs 18a–d each include battery 40, transmit and receive antenna 42, display 46, memory 47, and EPL circuitry 48.

Battery 40 provides power to EPLs 18a–d.

Transmit and receive antenna 42 receives messages from CBS 15a–d.

Transmit and receive antenna 42 transmits responses to price change and status messages to CBS 15a–d.

Display 46 displays price and possibly additional information, such as diagnostic information in response to an individual or broadcast diagnostic message from CBSs 15a–d. Display 46 is preferably a liquid crystal display and includes glass 49.

Memory 47 stores identification information.

EPL circuitry 48 controls the internal operation of EPL 18a–d and includes a transceiver.

Figure 3:
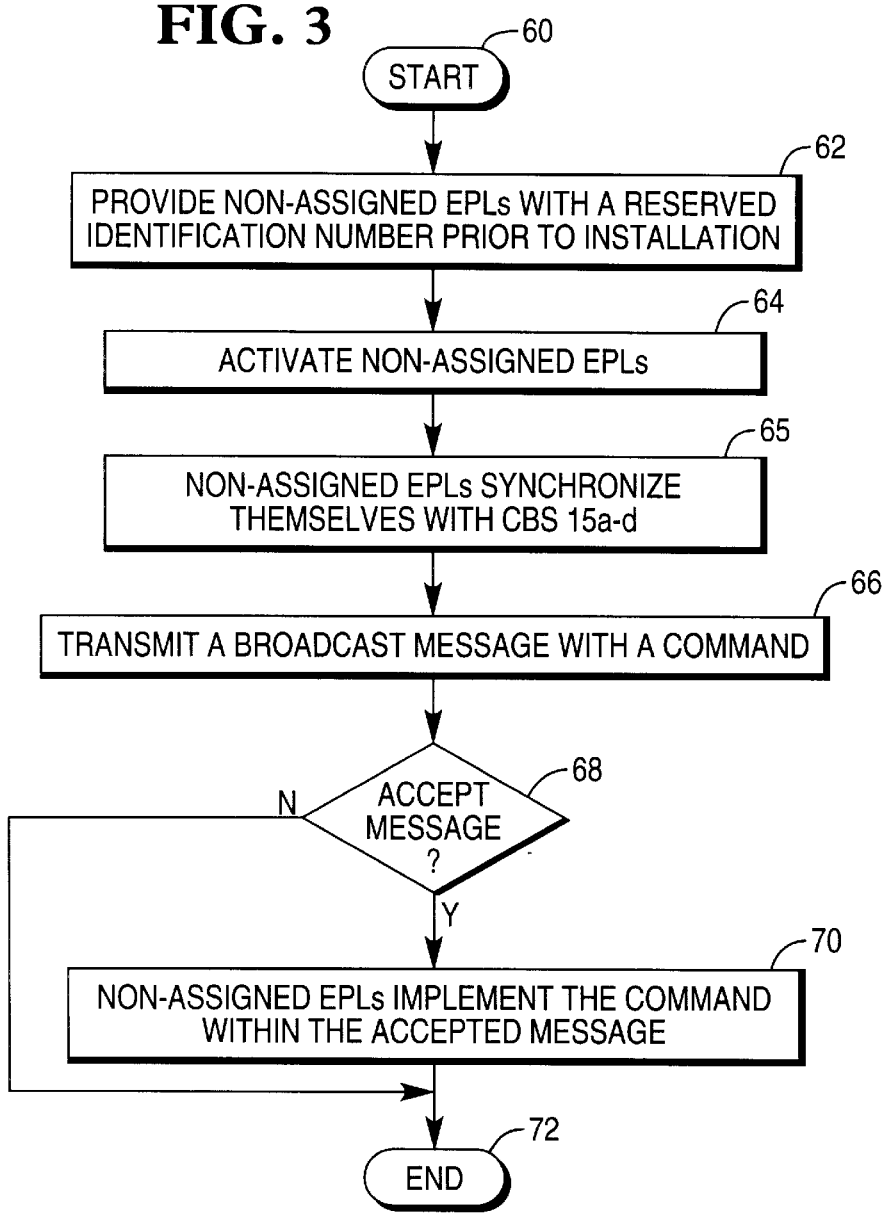
FIG. 3 is a flow diagram illustrating a first method of sending messages to EPLs prior to their identification with price look-up (PLU) items.

Turning now to FIG. 3, the method of sending messages to non-assigned EPLs prior to their identification with price look-up (PLU) items is illustrated in more detail, beginning with START 60. This method involves a broadcast message.

In step 62, new and non-assigned EPLs are provided with a reserved EPL identification number prior to installation. The preferred reserved identification number is "FFFF".

In step 64, the non-assigned EPLs having the reserved identification number are activated.

In step 65, the non-assigned EPLs synchronize themselves with CBSs 15a–d. When synchronized, the EPLs are ready to receive a message. Synchronization involves adjusting EPL circuitry 48 (i.e., a receiver portion) to receive transmissions from CBSs 15a–d. In other words, CBSs 15a–d transmit many messages and an EPL must train itself to begin listening and decoding the message at the proper time.

In step 66, CBSs 15a–d transmit a broadcast message containing a command, such as a diagnostic command. The broadcast message contains the broadcast message identification number, "0000", and may be addressed to assigned EPLS, non-assigned EPLs ("FFFF"), or both assigned and non-assigned EPLs. In the latter case, individual EPL identification numbers for the assigned EPLs are included with the address for the non-assigned EPLs.

In step 68, all EPLs receive the message and determine whether the received message is one they will accept or reject. The non-assigned EPLs accept the message, since the message is addressed to their reserved EPL identification number ("FFFF").

The EPLs implement the commands within the accepted message in step 70. The commands may include a diagnostic command, in response to which store personnel can visually check for proper operation of displays 46.

In step 72, the method ends.

If the message were not addressed to the non-assigned EPLs, the non-assigned EPLs would reject the message, and the method would proceed directly to END, in step 72.

Turning now to FIG. 4, a second embodiment of the method of the present invention begins with START 80. The second embodiment relates to a method of communicating an assignment command to non-assigned EPLs for the purpose of assigning identification numbers to them.

In step 82, new EPLs are provided with a unique serial number prior to installation. The preferred unique serial numbers are within the repeating sequence "0" to "FFFFFFFF".

The unique serial number is used to signal a non-assigned EPL to change its identification number to the identification number contained in the data portion of the message.

In step 84, non-assigned EPLs are activated.

In step 85, the non-assigned EPLs synchronize themselves with CBSs 15a–d.

In step 86, CBSs 15a–d transmit a "change identification number" message containing a "change identification number" command to one of the non-assigned EPLs having a unique serial number.

In step 88, the non-assigned EPLs receive the message and determine whether the received message is one they will accept or reject. One of the non-assigned EPLs may accept the message if the message is addressed to its unique serial number.

The non-assigned EPLs to which the message is not addressed reject the message and the method ends in step 92.

The non-assigned EPL to which the message is addressed accepts the message and that non-assigned EPL implements the "change identification number" command within the accepted message in step 90.

In step 92, the method ends.

Although the present invention has been described with particular reference to certain preferred embodiments thereof, variations and modifications of the present invention can be effected within the spirit and scope of the following claims.

What is claimed is:

1. A method of sending a command to electronic price labels (EPLs) prior to their assignment to price look-up (PLU) items comprising the steps of:

providing the EPLs with a single unique reserved temporary EPL identification number prior to their installation in a transaction establishment;

transmitting a broadcast message addressed to the single reserved temporary EPL identification number of the EPLs after their installation in the transaction establishment, wherein the broadcast message contains the command; and accepting the message by the EPLs.

2. The method as recited in claim 1, wherein the command comprises a diagnostic command.

3. A method of sending a command to an EPL prior to its assignment to a price look-up (PLU) item comprising the steps of:

providing the EPL with a unique temporary EPL identification number prior to its installation in a transaction establishment;

transmitting a message addressed to the unique temporary EPL identification number of the EPL after its installation in the transaction establishment, wherein the message contains the command; and accepting the message by only the EPL.

4. The method as recited in claim 3, wherein the command comprises a change EPL identification number message.

5. A method of installing an electronic price label (EPL) in a transaction establishment comprising the steps of:

assigning a single unique temporary EPL identification number to the EPL prior to its mounting in the transaction establishment;

preventing the EPL from responding to broadcast messages while it is assigned the single unique temporary EPL identification number;

transmitting a message addressed to the unique temporary EPL identification number of the EPL after its placement in the transaction establishment and its assignment to a price look-up (PLU) file item, wherein the message contains a change address command and a new EPL identification number;

accepting the message by only the EPL; and executing the change address command to replace the single unique temporary EPL identification number with the new EPL identification number.

6. A method of determining the operability of electronic price labels (EPLs) prior to their assignment to price look-up (PLU) items comprising the steps of:

providing the EPLs with a single unique reserved temporary EPL identification number prior to their installation in a transaction establishment;

transmitting a broadcast message addressed to the single reserved temporary EPL identification number of the EPLs after their installation in the transaction establishment, wherein the broadcast message contains the single unique reserved temporary EPL identification number and a diagnostic command;

accepting the message by a number of the EPLs which are operating; and executing the diagnostic command by the operating EPLs.

* * * * *